UNITED STATES PATENT OFFICE.

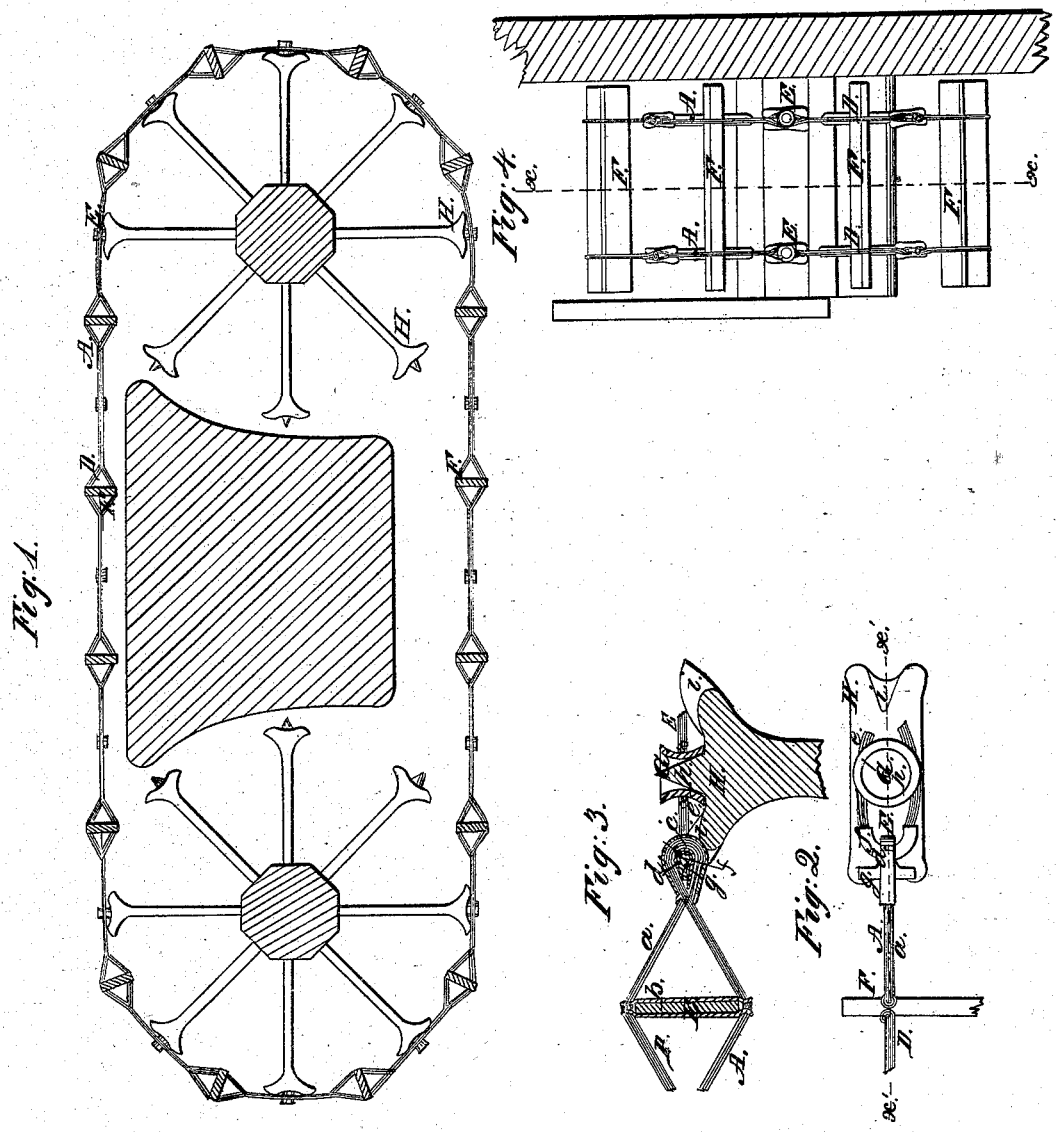

ANGUS McDONALD, OF MATTAWAN, MICHIGAN.

IMPROVED ENDLESS-CHAIN PROPELLER.

Specification forming part of Letters Patent No. 48,574, dated July 4, 1865.

*To all whom it may concern:*

Be it known that I, ANGUS MCDONALD, of Mattawan, in the county of Van Buren and State of Michigan, have invented a new and Improved Propeller for Steamboats and other Vessels; and I do hereby declare that the following is a full, clear, and exact description thereof, which will enable those skilled in the art to make and use the same, reference being had to the accompanying drawings, forming part of this specification, in which—

Figure 1 is a side sectional view of my invention, taken in the line $x\ x$, Fig. 4; Fig. 2, an enlarged plan or top view of a portion of the same; Fig. 3, a side sectional view of Fig. 2, taken in the line $x'\ x'$; Fig. 4, an end view of the invention.

Similar letters of reference indicate corresponding parts.

This invention consists in the employment or use of endless chains of buckets peculiarly constructed and arranged to work over the ends of arms attached radially to rotating shafts, as hereinafter set forth, whereby a very durable propeller is obtained, especially for boats of light draft.

A A represent endless chains of buckets, which work around the ends of arms B attached radially to two shafts, C C, which pass transversely through the vessel. The chains A are composed of links D E, connected together so as to have alternate positions in the chains. The links D are composed of wire twisted so as to form cords $a$, which are doubled to form loops in which the ends of the buckets F are fitted, said loops fitting in notches in the ends of plates $b$ secured transversely to the buckets. The wire loops, near their ends, are bound together to form eyes $c$, which are covered at their outer and inner surfaces by metal strips $d$. (See Figs. 2 and 3.) The links E are also constructed of twisted wires $e$, which are turned once or twice around metal thimbles G, and have their ends secured to metal bars, the inner parts, $f$, of which are of semicircular or an approximate form, and have an outer T-shaped part, $g$, as shown clearly in Fig. 2. These metal ends of the wires $e$ of the links E are fitted in the eyes $c$ of the links D, and form a connection for the links D E, as will be fully understood by referring to Figs. 2 and 3. The twisted wires of the links are covered with paint or other substance which will prevent oxidation. The ends of the arms B are flattened or spread out, forming a T-shaped chair, H, with a pointed projection, $h$, at the center, which passes into the thimbles G of the links E as the arms rotate, and operate the chains of buckets, the ends of the chairs H of the arms B being notched, as shown at $i$, so as to insure the projections $h$ catching into the thimbles.

By this means I obtain a very durable and economical propeller. The wire cords of the chain-links are preserved from wear on account of the manner in which they are connected together, and wire cords, as is well known, possess great strength with lightness, and are extremely durable when properly painted or protected from the weather, and in case of the breaking of a link it may be readily replaced by a new one. The power, of course, it will be understood, is applied to the shafts C C.

I claim as new and desire to secure by Letters Patent—

1. As an improvement in propellers, the combination of the twisted wire links D E, buckets F, and thimbles G, as and for the purposes specified.

2. The connecting of the links D E of said chains together by means of the eyes $c$, protected by metal strips $d$, and the metal bars composed of the parts $f\ g$, as set forth.

3. The arms B, provided with chairs H at their ends, having projections $h$, in connection with the thimbles G in the links E of the chains, substantially as and for the purpose specified.

ANGUS McDONALD.

Witnesses:
 L. M. HARRIS,
 MARTIN FLINT.